Patented June 24, 1952

2,601,460

UNITED STATES PATENT OFFICE 2,601,460

PROCESS FOR DYEING CELLULOSE ACETATE ARTICLES USING A BATH COMPRISING A DISPERSED ACETATE DYE, ETHYLENE GLYCOL MONOBUTYL ETHER, AND AN EMULSION OF POLYMETHYL VINYL KETONE

Victor S. Salvin, Irvington, N. J., assignor to Celanese Corporation of America, a corporation of Delaware No Drawing. Application March 4, 1949, Serial No. 79,729

2 Claims. (Cl. 8—4)

This invention relates to the coloration of solid masses and relates more particularly to the coloration of solid masses, such as shaped or molded articles, having a basis of an organic derivative of cellulose, which colorations are fast to washing, dry cleaning, crocking and the like.

An object of this invention is the provision of a process for the coloration of shaped masses having a basis of an organic derivative of cellulose, particularly cellulose acetate, whereby said materials may be dyed rapidly in deep shades and without causing any undesirable changes on the surfaces of the solid masses being dyed.

Other objects of this invention will appear from the following detailed description.

Thermoplastic masses such as molded articles having a basis of cellulose acetate or other organic derivative of cellulose are usually colored by incorporating a pigment or dyestuff base material in the powder from which the articles are molded. When the powder having the pigment or dyestuff incorporated therein is subjected to a molding operation, shaped articles having a uniform color throughout are obtained. In many industrial applications, a single molded shape is desired in a variety of colors, or even in a variety of shades of a single color. The production of said molded articles, accordingly, requires a different formulation for each desired color. This is, obviously, uneconomical and inconvenient since it creates a substantial inventory problem and also requires careful cleaning of the molding apparatus employed between runs of different colors or shades to avoid contamination. One solution to the problem is the production of molded articles in the greige, i. e. unfinished with respect to color, with or without a white pigment to impart opacity thereto and then to dye the molded articles in the desired shade or color. In the case of thermoplastic materials, such as cellulose acetate or other organic derivative of cellulose, the dyeing conditions must be such as to cause a rapid and deep penetration without, however, causing any undesirable surface changes. Dyeing processes heretofore employed have been found to be unsatisfactory since they required excessively long periods of immersion for proper penetration or excessive high temperatures or large proportion of volatile solvents such as alcohols. Such dyeing conditions adversely affect the surfaces of the molded articles, causing various types of distortion known in the art as an "orange peel" or "monkey skin" effect. Furthermore, the use of large amounts of volatile solvents in the dyebath makes control of the dyebath composition difficult as the volatile solvents evaporate very readily.

I have now found that molded articles having a basis of cellulose acetate or other organic derivative of cellulose may be dyed very rapidly in deep, level, non-crocking shades if said molded articles are dyed with a dyebath comprising an aqueous soap dispersion of a dyestuff for the cellulose acetate or other organic derivative of cellulose molded article containing an organic dyestuff solvent having, in the concentration in which it is employed, in said aqueous dispersion, no solvent action on the cellulose acetate or other organic derivative of cellulose material. While dyestuff solvent such as diacetone alcohol, benzyl alcohol, tetrahydrofurfuryl alcohol, cyclohexanone, ethyl lactate or gamma-valero lactone are satisfactory, I preferably employ as the dyestuff solvent a water-soluble mono-alkyl ether of the formula $R-O(CH_2CH_2O)_n-CH_2CH_2OH$, wherein R is a lower alkyl group such as a methyl, ethyl, propyl or butyl group and $n$ is 0 or 1. Advantageously, I employ the mono-butyl ether of ethylene glycol or the mono-ethyl ether of diethylene glycol as the dyestuff solvent in said dyebath.

The aqueous dyebaths I employ preferably contain from 5 to 10% by weight of a water-soluble dyestuff solvent and 0.1 to 0.3% by weight of a soap or other suitable detergent. In addition to the soap, Turkey red oil or other suitable emulsifying agent in an amount of 0.1 to 0.3% by weight may also be employed. Dyeing is preferably effected with the aqueous dyestuff solution at a temperature of 25 to 75° C. and the desired depth of shade may be readily obtained in from 30 seconds' to 2 minutes' immersion time. Although this period of immersion is quite short, satisfactory dyeing is achieved. Surprisingly enough, complete penetration of the molded material is not necessary to obtain deep shades. By my novel process, a very uniform degree of dyeing is achieved to a depth of from about 100 to 500 microns and this degree of penetration is sufficient to yield non-crocking, dyed molded materials. This depth of dyeing is all that is necessary to produce dyed materials which are entirely satisfactory for commercial applications, e. g. buttons. My novel dyebaths may also be employed for dyeing molded materials by spraying, painting, etc., whereby variegated effects may be obtained.

An improved gloss or polish may be imparted to the dyed molded materials by incorporating a suitable film-forming material in the aqueous dyebath, an emulsion of polymethyl vinyl ketone, polyvinyl alcohol, methyl cellulose, etc. added to the dyebath imparts a desirable gloss to the dyed, molded materials.

Various dyestuffs having an affinity for cellulose acetate or other organic derivative of cellulose materials may be employed for effecting said dyeing. The dyestuffs I employ are preferably those which are usually applied to cellulose acetate materials in a dispersed solubilized form. These dyestuffs may be either anthraquinone, diphenylamine or azo dyes. Examples of said dyestuffs are tetraamino-anthraquinone, 1-amino-4-hydroxy-anthraquinone, 2-nitro-4-sulfonamido-diphenylamine, 4-nitro-phenyl-azo-2-methyl-4-di(hydroxyethyl)-amino-benzene, and 4-acetylamino-benzene-azo-2-hydroxy-5-methyl benzene. Other dyestuffs having an affinity for cellulose acetate or other organic derivative of cellulose materials and which are applied thereto in a dispersed, solubilized form are well known in the art. While dispersing agents, such as sulfonated ricinoleic acid, may be employed, optimum results are obtained in the solubilization or dispersion of said dyestuffs by employing lignin sulfonate as the dispersing agent. The use of lignin sulfonate as the dispersing agent eliminates the formation of agglomerated dyestuff particles which tend to form deeply colored specks on the dyed materials. The amount of dyestuff present in the dyebath may vary from about 0.1 to 2% by weight thereof depending upon the depth of shade desired.

In order further to illustrate my invention, but without being limited thereto, the following examples are given:

*Example I*

A dyebath is prepared by adding 1 part by weight of a soap and 3 parts by of Turkey red oil to a mixture of 900 parts by weight of water and 90 parts by weight of the mono-butyl ether of ethylene glycol and then adding 6 parts by weight of a dyestuff disperse powder of tetra-amina-anthraquinone, said powder containing equal parts by weight of the dyestuff, lignin sulfonate and potassium pyrophosphate. The dyebath is heated to 40° C. and buttons molded of a thermoplastic cellulose acetate composition containing 30% by weight of diethyl phthalate as plasticizer and preferably smoothed or buffed on a polishing wheel are entered therein. The molded buttons are tumbled for 1 minute, removed from the dyebath, washed and dried. The buttons are dyed a deep navy blue shade by said treatment and are free of any surface distortion or surface changes. The dyeing is to a depth of about 250 microns.

*Example II*

Molded opaque cellulose acetate buttons are dyed with a dyebath of the composition described in Example I, employing, however, 90 parts by weight of the mono-ethyl ether of diethylene glycol and 6 parts by weight of a dyestuff disperse powder of 2-nitro-4-sulfonamido-diphenylamine containing equal parts by weight of the dyestuff, lignin sulfonate and potassium pyrophosphate. The buttons are tumbled in the dyebath maintained at 35° C. for 2 minutes and are then removed, washed and dried. The buttons are dyed a bright yellow shade fast to crocking and dry cleaning solvents. The dyeing is to a depth of 300 microns.

While the novel process of my invention has been more particularly described in connection with the dyeing of materials molded of a thermoplastic cellulose acetate composition, molded materials having a basis of other thermoplastic organic derivative of cellulose materials may be dyed in similar fashion. Examples of other organic derivatives of cellulose are cellulose esters such as cellulose propionate, cellulose butyrate, cellulose acetate-propionate and cellulose acetate-butyrate or cellulose ethers such as ethyl cellulose or benzyl cellulose. These organic derivatives of cellulose may also contain suitable plasticizers therefor in amounts of from 20 to 40% by weight depending upon the hardness, softness or other physical characteristics desired in the molded materials. Examples of suitable plasticizers are dimethyl phthalate, ethyl phthalyl, ethyl glycollate, triethylene glycol, triphenyl phosphate, tricresyl phosphate, diethyl phthalate, dimethoxy ethyl phthalate, dibutyl phthalate, triacetin and tripropionin. Plasticizers such as mineral oil, butyl stearate or partially hydrogenated terphenyls are also suitable for plasticizing cellulose ethers.

It is to be understood that the foregoing detailed description is given merely by way of illustration and that many variations may be made therein without departing from the spirit of my invention.

Having described my invention, what I desire to secure by Letters Patent is:

1. Process for the dyeing of molded articles which comprises immersing molded articles having a basis of cellulose actate in a dyebath comprising a dispersed cellulose acetate dyestuff, a soap, an emulsion of polymethyl vinyl ketone and the monobutyl ether of ethylene glycol, and maintaining the shaped masses therein until dyed to a depth of 100 to 500 microns.

2. Process for the dyeing of molded articles, which comprises immersing molded articles having a basis of cellulose acetate in a dyebath comprising a dispersed cellulose acetate dyestuff containing an emulsion of polymethyl vinyl ketone, 0.1 to 0.3% by weight of a soap, 0.1 to 0.3% by weight of Turkey red oil and 5 to 10% by weight of the mono-butyl ether of ethylene glycol and maintaining the shaped masses therein at a temperature of 25 to 75° C. until dyed to a depth of 100 to 500 microns.

VICTOR S. SALVIN.

REFERENCES CITED

The following references are of record in the file of this patent:

UNITED STATES PATENTS

| Number | Name | Date |
|---|---|---|
| 1,723,271 | Ellis | Aug. 6, 1929 |
| 1,885,475 | Persiel | Nov. 1, 1932 |
| 1,891,520 | Bowley | Dec. 20, 1932 |
| 1,927,144 | Whitehead | Sept. 19, 1933 |
| 2,095,221 | Smith | Oct. 5, 1937 |
| 2,188,160 | Rooney | Jan. 23, 1940 |
| 2,413,559 | Greenless | Dec. 31, 1946 |
| 2,524,811 | Koberlein | Oct. 10, 1950 |